United States Patent
Seaman et al.

(10) Patent No.: US 6,175,878 B1
(45) Date of Patent: *Jan. 16, 2001

(54) INTEGRATION OF SYSTEMS MANAGEMENT SERVICES WITH AN UNDERLYING SYSTEM OBJECT MODEL

(75) Inventors: Michael R. C. Seaman, Kirkland; Anirudh A. Sahni; Mark S. Blanford, both of Redmond; Isaac J. Heizer, Woodinville, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/667,848

(22) Filed: Jun. 20, 1996

Related U.S. Application Data (63) Continuation of application No. 08/082,988, filed on Jun. 25, 1993, now abandoned.

(51) Int. Cl.[7] .................. G06F 9/00; G06F 9/46; G06F 15/163
(52) U.S. Cl. .................. 709/315; 709/310; 709/201
(58) Field of Search .................. 395/121, 682, 395/683, 200.49, 200.54; 709/310, 318, 315, 200, 201, 313

(56) References Cited

U.S. PATENT DOCUMENTS

| | | | | |
|---|---|---|---|---|
| 5,095,522 | * | 3/1992 | Fujita et al. | 395/200 |
| 5,307,490 | * | 4/1994 | Davidson et al. | 395/650 |
| 5,367,635 | * | 11/1994 | Bauer et al. | 395/200 |
| 5,475,817 | * | 12/1995 | Waldo et al. | 709/303 |
| 5,475,819 | * | 12/1995 | Miller et al. | 395/200.49 |
| 5,491,796 | * | 2/1996 | Wanderer et al. | 395/200.54 |
| 5,581,760 | * | 12/1996 | Atkinson et al. | 717/2 |
| 5,682,536 | * | 10/1997 | Atkinson et al. | 717/3 |
| 5,689,703 | * | 11/1997 | Atkinson et al. | 707/103 |

OTHER PUBLICATIONS

Microsoft and Digital Corporation,The Component Object Model Specification, Draft Version 0.9, Oct. 24, 1995, pp. 1–60.*

Moeller et al, "Microsoft fights to pish 'open' object technology (Microsoft's Component Object Model and Distributed Component Object Model technology)", Oct. 31, 1996, PC Week, v13, n40, p6.*

Brockschmidt, "Introducing OLE 2.0, Part I: Windows Objects and Component Object Model. (object Linking and Embedding)" Aug. 1993, Microsoft System Journal, v8, n8, p15.*

North, "Understanding OLE: Microsoft's language–independent, binary standard for object sharing on desktops and across networks" Jun. 1995, DBMS, v8, n7, p50.*

(List continued on next page.)

Primary Examiner—Mark H. Rinehart
Assistant Examiner—Peter Stecher
(74) Attorney, Agent, or Firm—Christensen O'Connor Johnson Kindness PLLC (57) ABSTRACT

A systems management subsystem provides resources for managing components and allows components to be manageable. In particular, state information about managed components is encapsulated into objects that are visible in the global name space. The state of a single component may be partitioned into subcomponents that are stored in separate objects. These objects may, in turn, be encapsulated into a single container object that is associated with the managed component. By placing the state information in the global name space, local processes and remote processes may both gain access to internal state information and properly manage the component.

24 Claims, 6 Drawing Sheets

OTHER PUBLICATIONS

Williams, "An MSJ interview with Microsoft's chief architect of OLE, Tony Williams, (programmer who developed Object Linking and Embedding)", Oct. 1993, Microsoft Systems Journal, v8, n10, p55.*

*Information technology—Open Systems Interconnection—Common management information protocol specification*; International Standard ISO/IEC 9596: 1990 (E); First edition May 15, 1990; Scope pp. 1–28 and Part II pp. 1–44.*

Matthew G. Naugle, *Local Area Networking*; Appendix D/Network Management; 1991; pp. 221–225.*

Decouchant et al., "Guide: An implementation of the Comandos object–oriented distributed system architecture on UNIX," *The Autumn EUUG Conference*, pp. 181–193, Oct. 1988.*

Chase et al., "The Amber System: Parallel Programming on a Network of Multiprocessors," *Operating Systems Review (SIGOPS)* 23(5):147–158, 1989.*

Hong et al., "An Associated Object Model for Distributed Systems," *Operating Systems Review (SIGOPS)* 24(4):34–51, Oct. 3, 1990.*

Linnel, D., "Windows NT, Can Microsoft Make the Jump From the Desktop to Distributed Computing?," *Data Communications International* 22(6):68–77, Apr. 1993.*

"The C Programming Language", Brian W. Kernighan, Dennis M. Ritchie, $2^{nd}$ Edition, Prentice Hall, 1988, pp. 31–34.*

* cited by examiner

INTEGRATION OF SYSTEMS MANAGEMENT SERVICES WITH AN UNDERLYING SYSTEM OBJECT MODEL

CROSS-REFERENCE TO RELATED APPLICATION

This application is a continuation of U.S. patent application Ser. No. 08/082,988, filed Jun. 25, 1993, now abandoned.

TECHNICAL FIELD

The present invention relates generally to data processing systems and, more particularly, to the integration of system management services with an underlying system object model.

BACKGROUND OF THE INVENTION

In order for system management functions to properly perform their intended roles, the functions must be able to monitor the internal state of components that they manage. Conventional systems have not had access to the internal state of managed components. As a result, it has often been difficult for conventional systems to properly manage the components. Certain conventional systems have attempted to increase access to information concerning managed components by adding a separate framework and access technique for the internal state information. Such conventional systems, however, have not made the internal state information generally available through standard user-visible system interfaces and human interfaces.

SUMMARY OF THE INVENTION

In accordance with a first aspect of the present invention, a method is practiced in a distributed system having at least one memory device and processors for running processes. In this method, the internal state of a managed component is represented as an object in one of the memory devices. The object is visible to the processes on the processors. The object is then accessed on behalf of one of the processes to obtain the internal state of the managed component.

The managed component may be partitioned into a single subcomponent or into multiple subcomponents. Each of the subcomponents has an internal state. Furthermore, the method may include the additional step of encapsulating the object into a container object for the component. The container object is stored in one of the memory devices and is visible to processes run on the processor. The method is adaptable to use with multiple components to be managed. A system management object may be stored in the memory devices. The system management object manages the managed component.

In accordance with another aspect of the present invention, a distributed system includes memory devices and processors for running processes. The distributed system also includes a component to be managed that has an internal state. The distributed system includes a means for storing the internal state of the component in the memory device as an object. The distributed system further includes a means for making the object accessible by the processes run on the processors.

In accordance with yet another aspect of the present invention, a method is practiced on a distributed system having a remote procedure call facility, a first data processing system and a second data processing system. The first data processing system includes a processor running a process. The second data processing system includes a component having a state and a memory device. In this method, an object is stored in the memory device of the second data processing system. The object holds the state of the component. The process running on the processor of the first data processing system requests access to the state of the component that is held in the object. In response to the request, a remote procedure call is performed using the remote procedure call facility to gain access by the process to the information about the state of the component held in the object.

In accordance with a still further aspect of the present invention, a method is practiced in a distributed system having storage devices for storing objects having names, processors running programs having states and an operating system. The operating system includes a name service which provides a global name space for the names of objects stored in the storage devices. In this method, a variable is declared in a program to be a variable whose value is available in the global name space. The program is run on one of the processors so that the variable is assigned a value, and the value is stored in the object that is visible in the global name space. The variable may be a counter that is incremented in predetermined quantities, a meter whose value varies over a predetermined range or any other variable that holds state information about the program.

In accordance with an additional aspect of the present invention, a method is practiced in a distributed system having data processing resources and at least one memory device. In this method, the data processing resources, which may include hardware components and/or software components, are modeled as objects with names. The named objects are stored in the memory device. System management objects having names are also stored in the memory device. The system management objects are used to manage the data processing resources.

DETAILED DESCRIPTION OF THE INVENTION

Figure 1:
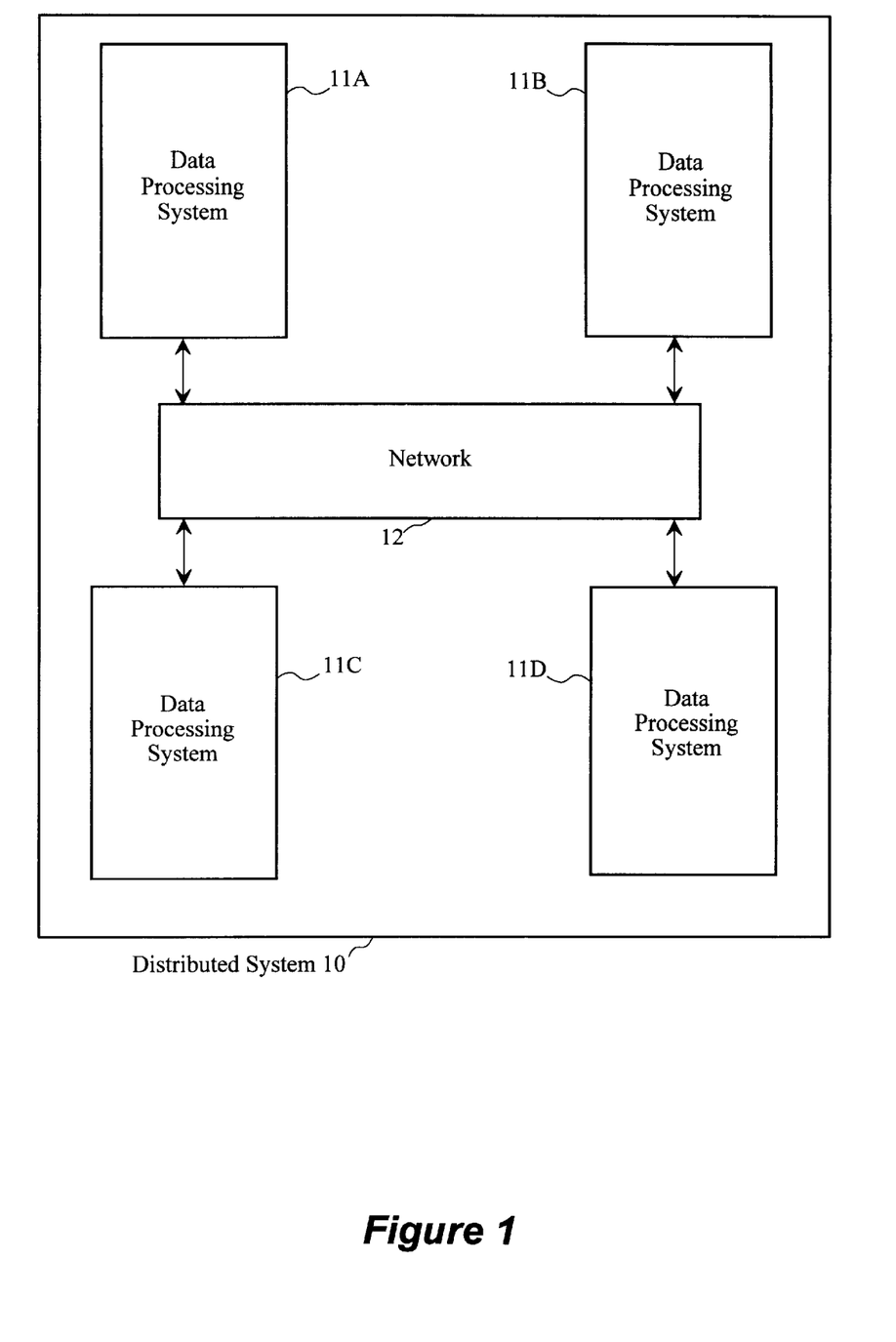
FIG. 1 is a block diagram of a distributed system for practicing a preferred embodiment of the present invention.

A preferred embodiment of the present invention integrates system management services with an underlying system object model. FIG. 1 shows a block diagram of a distributed system 10 for practicing the preferred embodiment of the present invention. Those skilled in the art will recognize that the distributed system 10 of FIG. 1 is merely illustrative and will appreciate that the present invention may be practiced in other distributed systems. The distributed system 10 includes four data processing systems 11A, 11B, 11C and 11D. The data processing systems 11A, 11B, 11C and 11D communicate with each other over a network 12, such as a local area network (LAN).

Figure 2:
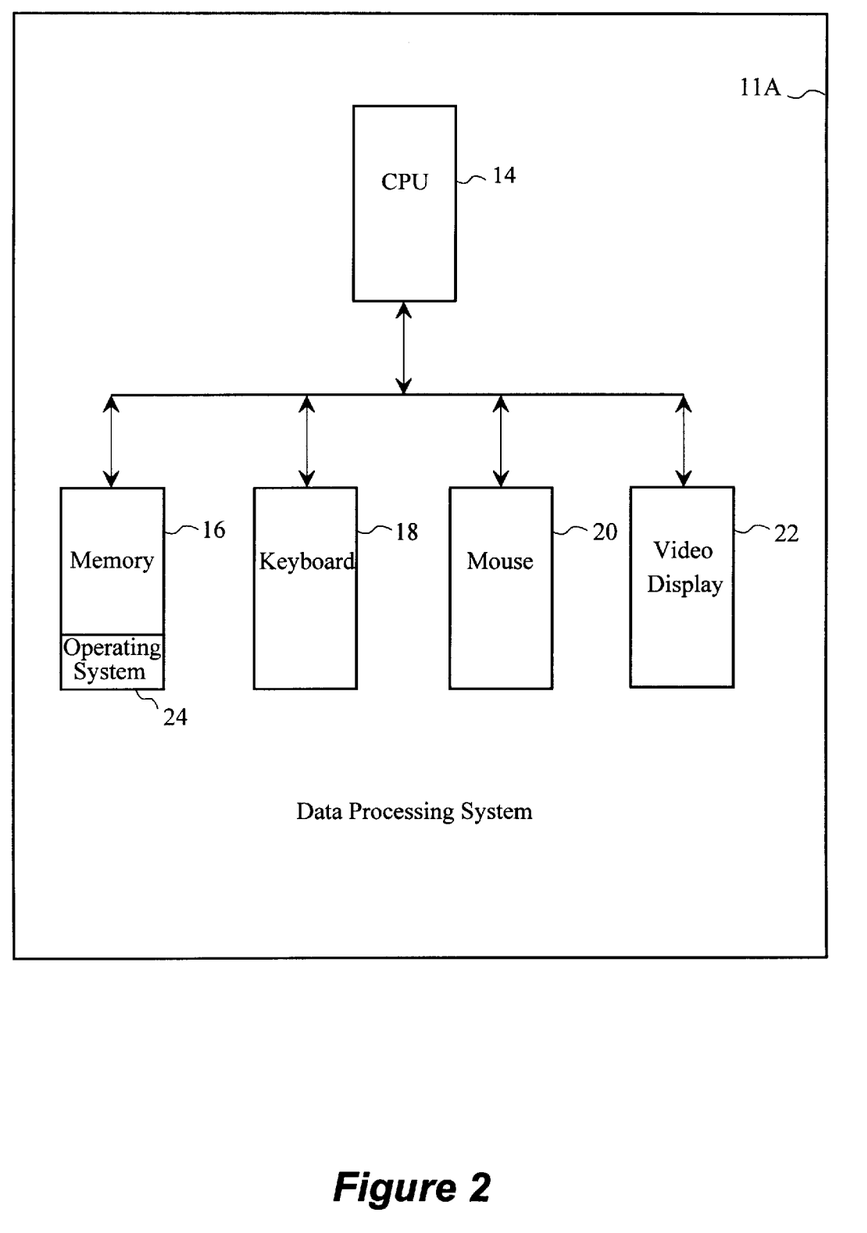
FIG. 2 is a block diagram of a data processing system of the distributed system of FIG. 1.

FIG. 2 shows a more detailed block diagram of data processing system 11A. For purposes of simplicity in the discussion below, it will be assumed that data processing systems 11B, 11C and 11D have similar configurations. Data processing system 11A includes a central processing unit (CPU) 14, a memory 16, a keyboard 18, a mouse 20 and a video display 22. The memory 16 holds a copy of an object-oriented operating system 24. A separate copy of the operating system 24 is run by each of the data processing systems 11A, 11B, 11C and 11D (FIG. 1). The operating system 24 is divisible into a number of subsystems, including a systems management subsystem that is responsible for managing components of the system. The systems management subsystem is the focus of the discussion below.

In order for one to understand how the preferred embodiment of the present invention operates, it is necessary for one to first understand certain object-oriented programming concepts that are employed therein. A first object-oriented concept employed by the preferred embodiment is the notion of an "object." An "object" is an entity that is a combination of at least two things: data that specifies an internal state of the object and functions that act upon the data. An object may be viewed as a combination of data structures and functions. The functions are restricted to operate only upon the elements of the data structure.

A closely related concept is the concept of an "interface". An "interface" is a group of semantically related functions that are organized into a named unit (the name being the identifier of the interface). Interfaces, by definition, have no instantiation (i.e., an interface does not include code for implementing the functions that are identified in the interface); rather, interfaces specify a set of signatures for functions. "Instantiation" refers to the process of creating in-memory structures that represent an object so that operations can be invoked on the object. When an object "supports" an interface, the object provides code for the functions specified by the interface. Thus, the object that supports the interface is responsible for providing the code for implementing the functions of the interface. The code that is provided must comply with the signatures of the functions specified by the interface (i.e., the code must have the same parameters and functionality as specified in the interface). Accordingly, an interface may be viewed as a standard with which objects must comply.

Another concept employed in the preferred embodiment is the notion of a "moniker". A "moniker" is a composite name for an object that includes a pointer to the object. A more formal definition of a moniker is an object that supports the IMoniker interface (as specified by the Microsoft OLE 2.0 protocol). The IMoniker interface includes a function for binding the moniker to the object to which the pointer of the moniker points. Binding gets an object into a running state so that services supplied by the object may be invoked. It should be appreciated that the present invention is not limited to embodiments that use monikers. The discussion of monikers in the preferred embodiment is merely illustrative.

As mentioned above, the preferred embodiment of the present invention integrates the system management subsystem into the underlying object model of the object-oriented operating system 24. In other words, the operating system models components of the distributed system 10 as objects and the system management subsystem is integrated into the objects. The integration of the system management subsystem with the underlying system object model provides a unified approach to accessing system management functions. Moreover, the integration facilitates use of tools in the system management subsystem that are provided by other subsystems of the operating system 24. Still further, the integration allows the system management subsystem to easily gain access to internal state information about managed components that are modeled as objects. The cumulative result of the integration is a substantial lessening in the burden imposed on the system management subsystem and a substantial increase in the powers available to the system management subsystem.

Systems management is provided in the preferred embodiment of the present invention by allowing system components to be constructed so that they are readily manageable and by providing utilities for managing the system components. Each system component in the distributed system 10 is modeled as an object. Subcomponents of a component may also be separately modeled as objects. System components are made to be manageable by encapsulating the components and subcomponents into objects that are visible in the global name space. The subcomponents and components include properties that specify state information. Since the state information is held in an object which is visible in the global distributed name space, other objects are able to gain access to the state information. Moreover, since the components and subcomponents are modeled as objects, they are readily located and accessed. In general, each managed object supports interfaces that provide services to other client objects.

Figure 3:
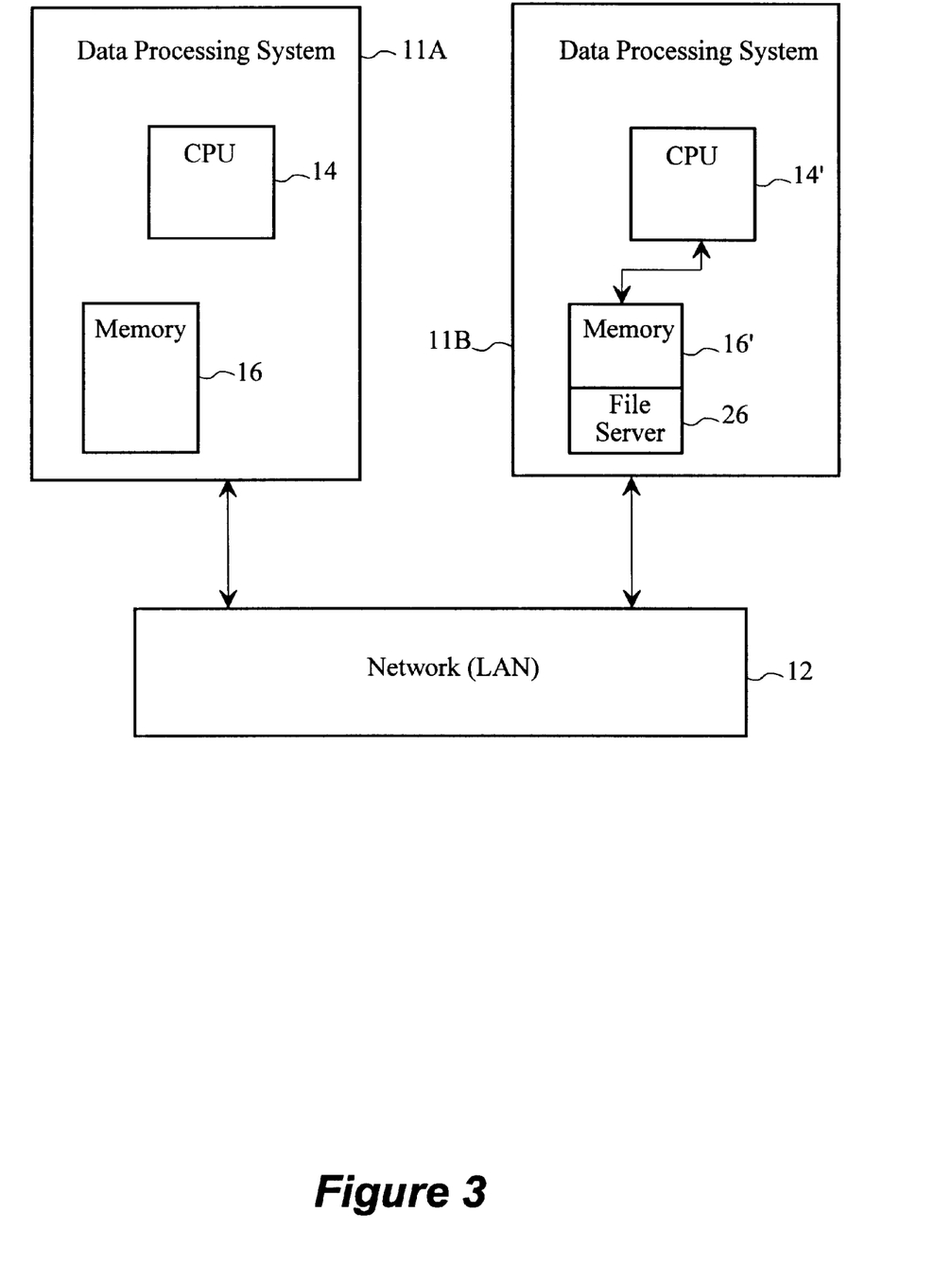
FIG. 3 is a block diagram illustrating in more detail two data processing systems in the distributed system of FIG. 1.

The operation of the systems management subsystem of the preferred embodiment is perhaps best explained by way of example. The system management subsystem is not isolated on a single one of the data processing systems 11A, 11B, 11C and 11D. Rather, the responsibilities of the system management subsystem are shared among the data processing systems 11A, 11B, 11C and 11D so that the data processing systems jointly perform systems management. As shown in FIG. 3, suppose that data processing system 11A, in performing system management functions, wishes to find out additional information about the state of a file server 26, which is held remotely in memory 16' of data processing system 11B. In this example, the file server 26 is the managed component that the system management subsystem seeks to manage. The state of the file server 26 is partitioned for convenience into a number of subcomponents. In particular, the file server 26 is partitioned into a request receiver, a request processor and a result returner. The request receiver is responsible for receiving requests for service from the file server. The request processor is responsible for processing such requests, and the result returner is responsible for returning the results of the service to the client that requested the service.

It should be appreciated that the set of subcomponents included in a managed component need not remain the same; rather, the subcomponents may change dynamically over time such that subcomponents are added and deleted as time progresses. It should also be appreciated that the subcomponents may be organized hierarchically.

Figure 4:
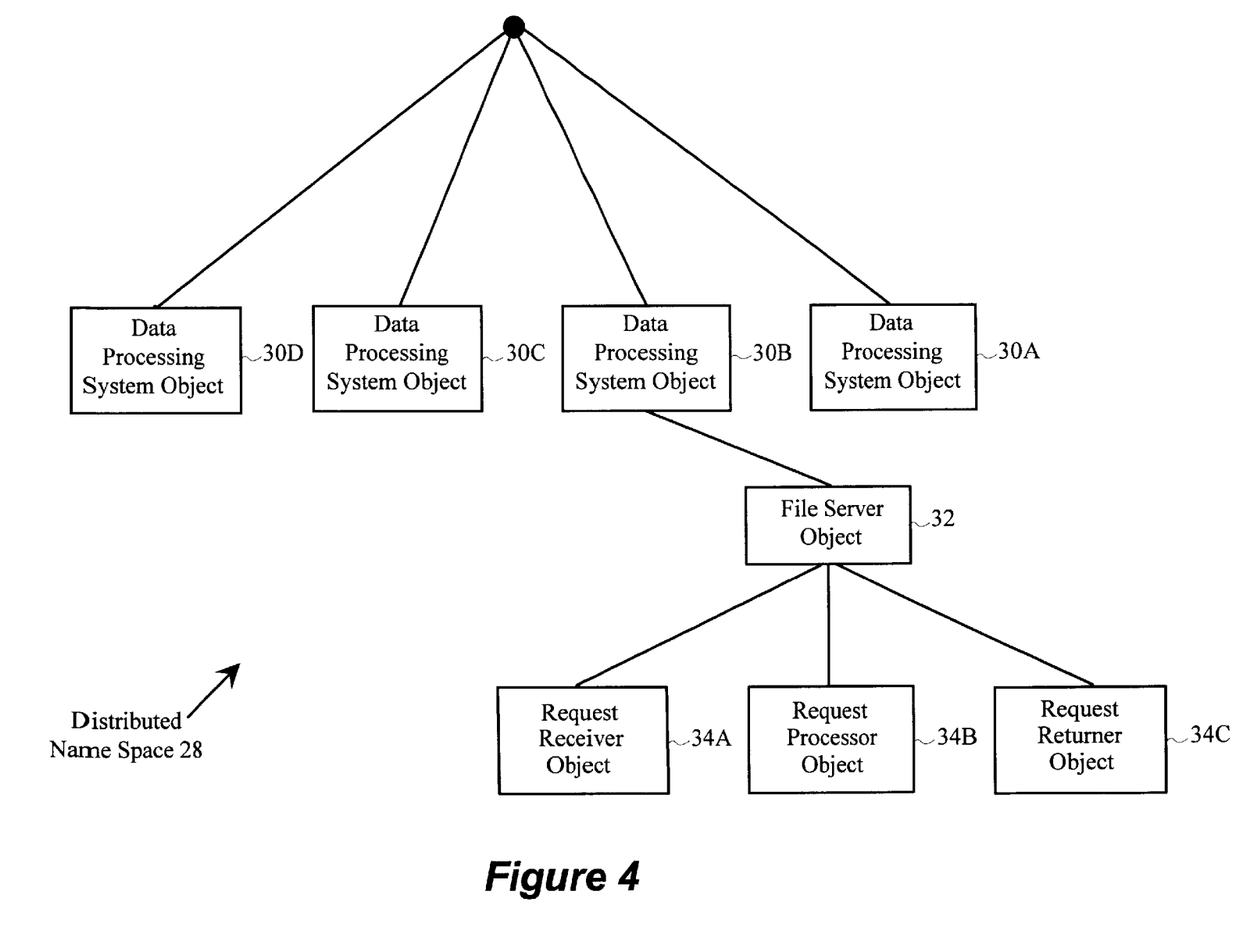
FIG. 4 is a diagram illustrating a distributed name space generated in accordance with the preferred embodiment of the present invention.

The CPU 14' of data processing system 11B makes information about the file server 26 and its subcomponents available to other components in the distributed system 10 (FIG. 1) by creating an object 32 for the file server and objects 34A, 34B and 34C for the subcomponents that hold state information about the file server and its subcomponents as illustrated in FIG. 4. These objects 32, 34A, 34B and 34C are visible in a distributed name space 28. Each of the data processing systems 11A, 11B, 11C and 11D (FIG. 1) in the distributed system 10 has access to the objects in the distributed name space 28 (FIG. 4). The distributed name space 28 also includes objects 30A, 30B, 30C and 30D that model the data processing systems 11A, 11B, 11C and 11D, respectively.

The file server object 32 is a "container." A container is an entity that contains other objects. In the example of FIG. 4, the file server object 32 is a container that contains objects 34A, 34B and 34C for the respective subcomponents of the file server 26. Hence, a managed component may be modeled as a container object that holds objects for the subcomponents of the managed object.

The file server object 32 is also a special type of object, known as a junction point, that differs from other objects in the distributed name space 28. A junction point is an object that serves as a junction between two name spaces. The file server object 32 is a junction point that joins the distributed name space with the name space of the subcomponents objects 34A, 34B and 34C. Access to subcomponents objects 34A, 34B and 34C may be made through the file server container object 32. Each of the subcomponent objects 34A, 34B and 34C supports an interface for monitoring and managing its behavior. Further, each of the subcomponent objects 34A, 34B and 34C holds state information regarding the respective subcomponent associated with the object. This state information is held in property sets stored in the subcomponent objects 34A, 34B and 34C, which may be queried to obtain the state information contained therein.

The junction point for the file server object 32 stores a globally unique ID (GUID) for the file server object 32. This GUID is used to uniquely identify the file server object 32 in the distributed name space 28. In addition, a current remote procedure call (RPC) address for an "agent" of the file server 26 is stored in the file server object 32. The agent is a body of library code provided by the operating system 24 that serves multiple purposes, including making the subcomponent objects 34A, 34B and 34C visible in the distributed global name space 28. The agent also provides a remote procedure call (RPC) server for making remote procedure calls on behalf of the file server and its subcomponents. There is a direct one-to-one correspondence between a managed component, such as the file server, and its agent. The operating system 24 provides application program interfaces (APIs) that allow a user to create a new agent, create objects for managed components and subcomponents, delete objects for managed components and subcomponents, and provide a response to operations on managed components and subcomponents. The agent is able to retrieve values of selected properties of a managed object, and the agent is able to modify the values of properties held in managed objects.

Figure 5:
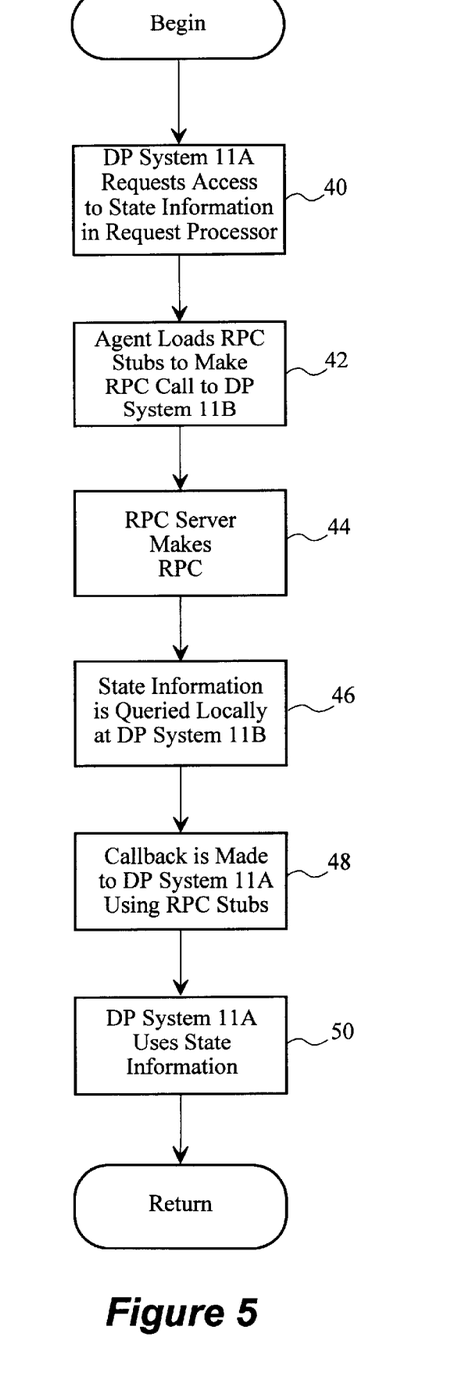
FIG. 5 is a flow chart illustrating the steps performed by the preferred embodiment of the present invention to allow sharing of internal state information across the distributed system of FIG. 1.

Returning to the example of FIG. 4, suppose hat data processing system 11A seeks access to the request processor subcomponent object 34B. FIG. 5 shows a flow chart of the steps performed to gain access to the status information held in the request processor object 34B. Initially, data processing system 11A requests access to state information that is held in the request processor subcomponent object 34B (step 40 in FIG. 5). The operating system 24 (FIG. 2) recognizes that the request processor subcomponent object 34B is a remote object that is stored in data processing system 11B. As a result, the agent for the subcomponent objects 34A, 34B and 34C is called on data processing system 11B using an RPC facility that is provided as part of the operating system 24.

The agent, in turn, loads RPC stub routines that package data and use the RPC facility to make the RPC call to data processing system 11B. Two sets of stub routines are loaded.

First, a set of stub routines is loaded at data processing system 11A to make the RPC call, and second, a set of stub routines is loaded at data processing system 11B to make the callback to data processing system 11A (step 42 in FIG. 5). The RPC stub routines at data processing system 11A are then executed to invoke the RPC server of the agent, which makes the RPC call (step 44). The status information is queried locally at data processing system 11B (step 46 of FIG. 5). The status information is queried by first finding a moniker for an interface supported by the request processor subcomponent object 34B (FIG. 4) and which allows querying of the status information held in the request processor subcomponent object. This moniker is obtained using the QueryInterface( ) function.

Each object in the distributed name space 28, by definition, must support the IUnknown interface (i.e., all objects support interfaces that inherit the IUnknown interface). The IUnknown interface includes the function, QueryInterface( ), for querying whether an object supports a particular interface. The QueryInterface( ) function returns to obtain a pointer to the code for implementing the functions. In general, whenever a function is called that is part of an interface supported by an object, the QueryInterface( ) function must first be called.

The moniker obtained by calling the QueryInterface( ) function points to an instance of the interface that is supported by the request processor subcomponent object 34B (FIG. 4). The moniker is then used to access functions for querying status information held in the request processor subcomponent object 34B.

Once the status information has been obtained locally at data processing system 11B, a callback is made to data processing system 11A using the RPC stub routines that were loaded earlier (step 48 in FIG. 5). Data processing system 11A then receives the status information and uses the status information for systems management functions (step 50 in FIG. 5).

The above-described example illustrates how the preferred embodiment of the present invention eases system management tasks. In particular, the preferred embodiment encapsulates state information for managed components into objects that are visible in the distributed name space so that remote access to the state information is possible. Moreover, since the state information is integrated into the underlying system object model, the objects holding the state information may be manipulated and managed using tools that may be employed with all types of objects.

Figure 6:
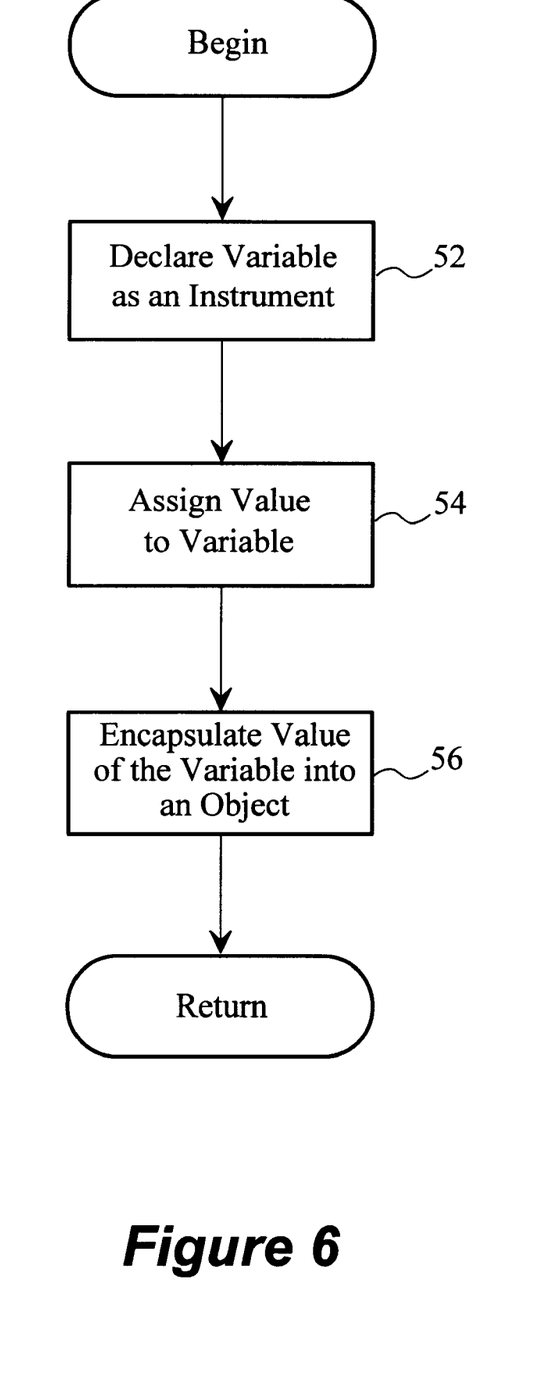
FIG. 6 is a flow chart illustrating the steps performed to use an instrument in the distributed system of FIG. 1.

The operating system 24 of the preferred embodiment of the present invention provides at least two kinds of "instruments." Instruments are variables whose value is visible in the distributed name space 28. FIG. 6 is a flow chart showing how instruments are used in the preferred embodiment of the present invention. Initially, a variable is declared as an instrument within an application program (step 52 in FIG. 6). The application program then assigns a value to the instrument during its execution (step 54). The value assigned to the instrument is encapsulated into a corresponding object that is visible in the distributed name space 28 (step 56). Accordingly, the value of the instrument may be obtained by querying the corresponding object.

Instruments are available in two varieties. A user specifies which variety of instrument he wants in the variable type declaration. A first variety of instrument is a counter. The counter acts in a fashion analogous to an odometer in that it is always increases in value until it is reset. Similarly, a second variety of instrument is a meter instrument that acts like a meter which may fluctuate between a range of values.

The preferred embodiment of the present invention also provides an additional mechanism for placing state information in the distributed name space 28. This mechanism is known as a workstation management agent. The workstation management agent puts the current state of a workstation into the distributed global name space 28.

While the present invention has been described with reference to a preferred embodiment thereof, those skilled in the art will, nevertheless, appreciate that various changes in form and detail may be made without departing from the present invention as defined in the appended claims. For instance, the present invention need not use interfaces or monikers; rather, other alternative mechanisms may be used.

We claim:

1. A method in a computer system for integrating system management services into an underlying operating system object model, the method comprising:
   (a) providing a system object that is compliant with the underlying operating system object model;
   (b) providing a system management object that is compliant with the underlying operating system object model, wherein the system management object is associated with a managed component and stores the internal state of the managed component;
   (c) providing a process that is compliant with the underlying operating system object model and that accesses the system object and the system management object through a global namespace, the process accessing the system management object by binding a moniker associated with the system management object;
   (d) making the system object and the system management object visible in the global namespace to the process;
   (e) accessing the internal state of the managed component with the process by way of an interface provided by the system management object that is visible to the process in the global namespace, wherein the moniker is obtained by the process through the interface; and
   (f) enabling the system management object to employ a tool provided by a subsystem of the operating system.

2. The method of claim 1, including providing a plurality of system objects, each of said plurality of system objects being compliant with the underlying operating system object model.

3. The method of claim 1, including providing a plurality of system management objects, each of said plurality of system objects being compliant with the underlying operating system object model.

4. The method of claim 1, including providing a plurality of processes. each of said plurality of processes being compliant with the underlying operating system object model.

5. The method of claim 1, wherein the computer system is a distributed system and the global namespace is a distributed name space.

6. The method of claim 1, further comprising accessing the internal state of the managed component with the process through the global name space.

7. The method of claim 1, wherein the system management object is accessed through an interface visible in the global namespace.

8. The method of claim 1, further comprising:
   (a) accessing the system management object by way of the interface provided by the system management object that is visible in the global namespace; and
   (b) setting the internal state of the managed component in the system management object using the process.

9. The method of claim 1, further comprising:
   (a) accessing the system management object by way of the interface provided by the system management object that is visible in the global namespace; and
   (b) reading the internal state of the managed component in the system management object using the process.

10. A computer-readable medium having stored thereon a data structure, comprising:
    (a) a system object that is compliant with an underlying operating system object model;
    (b) a system management object that is compliant with the underlying operating system object model, said system management object being associated with a managed component and storing an internal state of the managed component;
    (c) enabling the system management object to employ a tool provided by a subsystem of the operating system; and
    (d) said system object and said system management object being formed such that a process that is compliant with the underlying operating system object model accesses the system object and the system management object contained in the data structure by way of an interface provided by the system management object, wherein the process accesses the system management object by binding a moniker associated with the system management object and the moniker is obtained by the process through the interface.

11. The computer-readable medium of claim 10, wherein the data structure is stored in a distributed system.

12. The computer-readable medium of claim 11, wherein the distributed system has a plurality of nodes and portions of the data structure are stored on different nodes.

13. The computer-readable medium of claim 11, wherein the data structure is partitioned into multiple subcomponents, each subcomponent associated with a separate systems management object that stores a different internal state of the managed component.

14. A computer-readable medium having computer-executable components, comprising:
    (a) a system object component that is compliant with an underlying operating system object model;
    (b) a system management object component that is compliant with the underlying operating system object model, said system management object being associated with a managed component and storing an internal state of the managed component, the system management object component exposing an interface in a global namespace;
    (c) enabling the system management object to employ a tool provided by a subsystem of the operating system; and
    (d) a process component that is compliant with the underlying operating system object model and that can access the system object component and the system management object component to determine the internal state of the managed component, whereby the process component accesses the internal state of the managed component stored by the system management object component by way of binding a moniker associated with the system management object, the moniker being obtained by the process through the interface exposed by the system management object.

15. The computer-readable medium of claim 14, including a plurality of system object components, each of said system object components being compliant with the underlying operating system object model.

16. The computer-readable medium of claim 15, including a plurality of system management object components, each of said system object components being compliant with the underlying operating system object model.

17. The computer-readable medium of claim 16, including a plurality of process components, each of said process components being compliant with the underlying operating system object model.

18. The computer-readable medium of claim 17, wherein the managed component is partitioned into multiple subcomponents, each of the subcomponents having an internal state, and each of the multiple subcomponents associated with a separate systems management object component that stores the internal state of the subcomponent.

19. A method of communication between a client system management object and a server process in a distributed operating system having a distributed namespace, the method comprising:

(a) making the client system management object compliant with an underlying distributed operating system object model, said client system management object being associated with a managed component and storing an internal state of the managed component;

(b) providing a server process that is compliant with the underlying distributed operating system object model and enabling the server process to access the managed component and the client system management object through the distributed namespace, wherein the server process accesses the client system management object by binding a moniker associated with the client system management object;

(c) making an interface exposed by the client system management object visible in a global namespace to the server process;

(d) accessing the internal state of the managed component through the interface provided by the client system management object, wherein the moniker is obtained by the server process through the interface that is exposed by the client system management object in the global namespace; and (e) enabling the system management object to employ a tool provided by a subsystem of the distributed operating system.

20. The method of communication of claim 19, wherein the client system management object is Microsoft OLE™ compliant and provides an IMoniker interface through which communication is established.

21. The method of communication of claim 19, wherein the client management object is discovered by a server process in the distributed namespace without user intervention and communication between the client system management object and the server process is automatically established through the interface.

22. The method of claim 19, wherein the client system management object contains at least one subcomponent object, each subcomponent object exposing a subcomponent interface through which the subcomponent object is monitored and maintained.

23. The method of claim 22, wherein each of the subcomponent objects has an internal state and the internal state is accessed by way of the subcomponent interface.

24. The method of claim 22, wherein the client system management object contains a subcomponent object that is changed dynamically.

* * * * *

UNITED STATES PATENT AND TRADEMARK OFFICE
CERTIFICATE OF CORRECTION

PATENT NO. : 6,175,878 B1
DATED : January 16, 2001
INVENTOR(S) : M.R.C. Seaman et al.

It is certified that error appears in the above-identified patent and that said Letters Patent is hereby corrected as shown below:

Title page,
Item [56], References Cited, under U.S. PATENT DOCUMENTS, insert in appropriate numerical order the following:
-- 5,437,027    7/1995    Bannon et al. --
Delete "5,475,817    12/1995    Waldo et al."

Under OTHER PUBLICATIONS,
Delete entries 1-4 and replace them as follows:
-- Microsoft and Digital Corporation, "The
Component Object Model Specification, Draft
Version 0.9," Oct. 24, 1995, pp. 1-60.*

Moeller et al., "Microsoft fights to push 'open' object
technology (Microsoft's Component Object Model
and Distributed Component Object Model
Technology)," *PC Week*, vol. 14, No. 40, Oct. 31,
1996, p.6.*

Brockschmidt, "Introducing OLE 2.0, Part I:
Windows Objects and Component Object Model
(Object Linking and Embedding)," *Microsoft
Systems Journal*, vol. 8, No. 8, Aug. 1993, p. 15.*

UNITED STATES PATENT AND TRADEMARK OFFICE
CERTIFICATE OF CORRECTION

PATENT NO. : 6,175,878 B1
DATED : January 16, 2001
INVENTOR(S) : M.R.C. Seaman et al.

It is certified that error appears in the above-identified patent and that said Letters Patent is hereby corrected as shown below:

OTHER PUBLICATIONS cont'd,
North, "Understanding OLE: Microsoft's language-independent, binary standard for object sharing on desktops and across networks," *DBMS*, vol. 8, No. 7, Jun. 1995, p. 50.* --

Item [56], References Cited,
Delete entry 5 and replace it as follows:

-- Williams, "An MSJ interview with Microsoft's chief architect of OLE, Tony Williams, (programmer who developed Object Linking and Embedding)," *Microsoft Systems Journal,* vol. 8, No. 10, p. 55, Oct. 1993.* --

Column 5,
Line 55, "hat" should read -- that --

Column 7,
Line 52, "processes. each" should read -- processes, each --

Column 10,
Line 14, "OLE™" should read -- OLE --

Signed and Sealed this

Twentieth Day of November, 2001

Attest:

NICHOLAS P. GODICI
*Attesting Officer*   *Acting Director of the United States Patent and Trademark Office*